United States Patent [19]
Sletten et al.

[11] 3,719,945
[45] March 6, 1973

[54] NON-INTEGRAL RADAR PHASE COMPARISON SYSTEM FOR OBJECT RECOGNITION

[75] Inventors: Carlyle J. Sletten, Acton; William B. Goggins, Jr., Winchester; Philipp Blacksmith, Concord, all of Mass.

[73] Assignee: The United States of America as represented by the Secretary of the Air Force

[21] Appl. No.: 795,776

[52] U.S. Cl. ............343/5 SA, 343/17.2 R, 343/17.5
[51] Int. Cl. ................................................G01s 9/02
[58] Field of Search ...............343/5, 18 B, 17.2, 17.5

[56] References Cited

UNITED STATES PATENTS

| | | |
|---|---|---|
| 3,397,398 | 8/1968 | Dutton et al. ....................343/17.2 X |
| 3,478,354 | 11/1969 | Foster et al. ..............................343/5 |

*Primary Examiner*—Malcolm F. Hubler
*Attorney*—Harry A. Herbert, Jr. and George Fine

[57] ABSTRACT

A radar system of object recognition wherein non-integral coherent-harmonic frequency signals are transmitted towards the object of interest and the return signals therefrom are phase compared to provide a resultant signal having characteristics distinguishing the object from its background.

4 Claims, 1 Drawing Figure

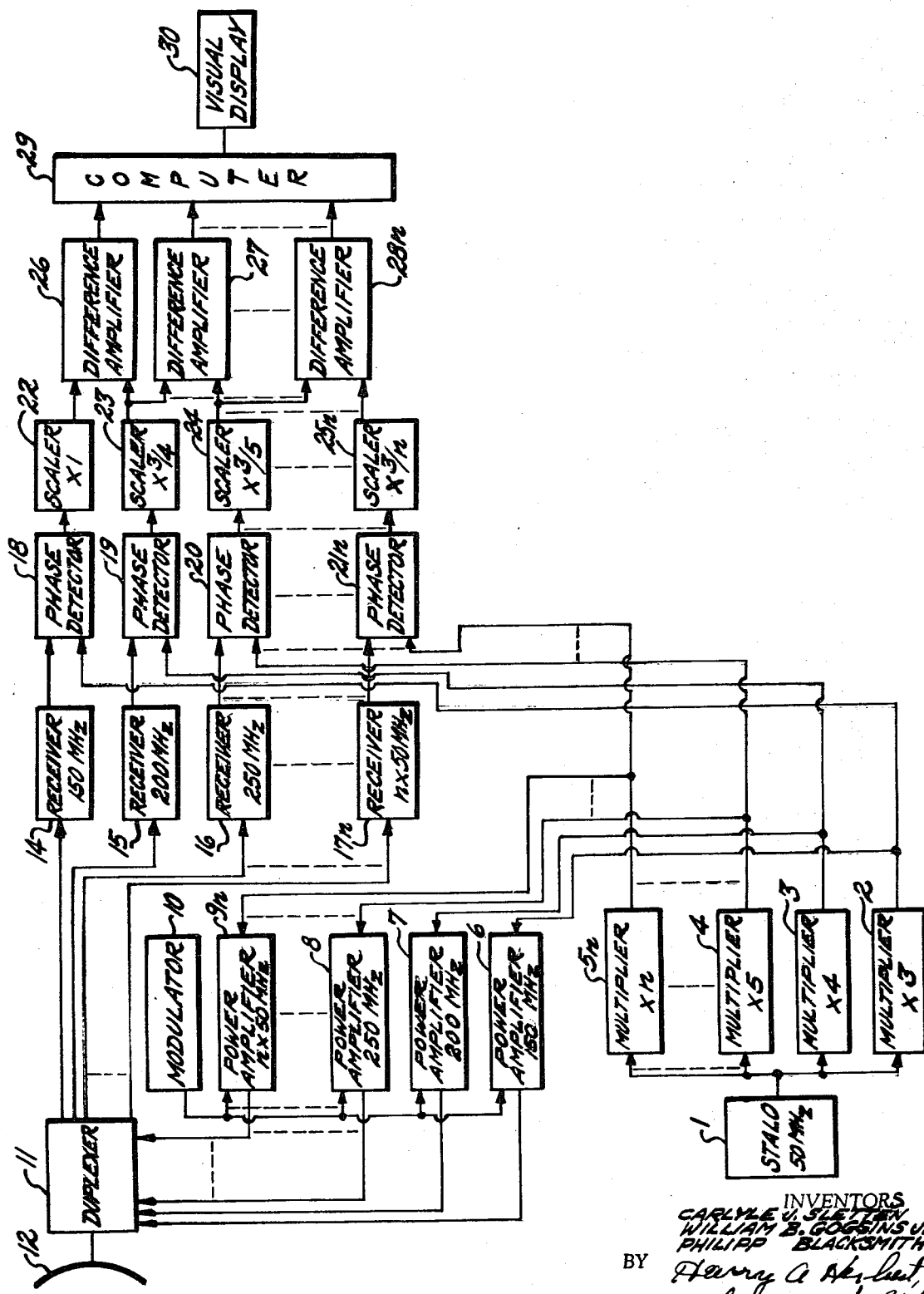

NON-INTEGRAL RADAR PHASE COMPARISON SYSTEM FOR OBJECT RECOGNITION

CROSS-REFERENCE TO RELATED APPLICATIONS

Filed at even date herewith is the U.S. patent application entitled "A Radar Phase Comparison Method and System For Object Recognition" by Carlyle J. Sletten, Allan C. Schell, Richard B. Mack, William B. Goggins, Jr., and Philipp Blacksmith in which is described a radar method and system of object recognition wherein coherent-harmonic integral signals are transmitted towards the object of interest and the return signal therefrom are phase compared to provide a resultant signal having characteristics distinguishing the object. In addition thereto and also filed at even date herewith is the U.S. patent application entitled "A Radar Phase Comparison System Including a Superhetrodyne Receiver" by Carlyle J. Sletten, Philipp Blacksmith, and William B. Goggins, Jr., in which multiple coherent-harmonic frequency signals are transmitted towards an object and the return signals therefrom are processed by a superhetrodyne apparatus for subsequent phase comparison purposes to provide a resultant signal having characteristics distinguishing the object from its background.

BACKGROUND OF THE INVENTION

This invention relates to a phase comparison radar system and more particularly to a phase comparison radar system wherein multiple non-integral signals having a coherent-harmonic relationship are transmitted towards an object of interest with the return signals therefrom providing a phase difference distinguishing the object of interest.

There has been developed in the past phase comparison as a method of radar angle determination on two-port antennas. The 3-D Height Finder System as disclosed by W. G. Mavroides, L. G. Dennett, and L. S. Dorr entitled "3-D Based on Phase-in-Space Principle" in IEEE Trans. on Aerospace and Electronics Systems, Vol. AES-2, No. 3, May 1966, uses a focusing reflector antenna and an extended line source feed with terminals at each end to measure angles within wide search beams. The same principles are being used with two identical low gain antennas operating with a H.F. radar such as disclosed by C. J. Sletten, P. Blacksmith, and C. E. Ellis in "Resonant-Region, Phase Comparison Radar for Detection of Objects in Clutter" in the Proceedings of First Counterinsurgency Research and Development Symposium, held at Institute for Defense Analyses, Arlington, Va., June 14–16, 1966.

The currents and driving E-fields (or voltages) on a metal object in free space have time phase relations which are dependent on object size and configuration. When an object about λ/2 long is illuminated by a plane wave it acts very much like an antiresonant circuit which has a rapid change of phase between current and voltage as frequency is varied. In free space the object is radiating and thus provides a resistive damping term which tends to broaden or flatten the sharp resonant curve one might measure for a tank circuit composed of L-C elements, for example. Thick objects such as rods or curved forms have even broader characteristics. However, characteristic phase shifts do occur for metal objects near resonant dimensions which, when properly instrumented, can be used to distinguish them from echoes from trees, soil, rocks and other lossy scatterers. Large dielectric or metal structures have different characteristic phase vs. frequency responses.

As the scattering from objects is directly related to the currents on the objects the phase between the incident plane wave and the back scattered wave is a measure of the circuit type of current voltage relations in familiar network theory mentioned. One method to find this phase shift at a single frequency is to measure the voltage standing wave ratio in the vicinity of the object. This is impractical at a remote radar site when the distance to the target is not precisely known.

The phase phenomena may be measured by a new technique which is independent of the range to the target and at the same time obtain a gauge of the phase shift as a function of frequency by the use of coherent harmonically related signals.

It is noted that in the aforementioned U.S. patent application entitled "A Radar Phase Comparison Method and System for Object Recognition" there was provided means for transmitting integral signals towards the object of interest. However, it is apparent in many radar applications that non-integral signals transmitted towards an object of interest would be preferable and desirable. Thus, the present invention is directed towards the provision of a system including non-integral signals of a coherent-harmonic relationship utilized for transmission towards the object of interest.

SUMMARY OF THE INVENTION

The present invention provides a radar system of object recognition wherein multiple signals of non-integral harmonic frequencies are directed towards the object of interest and the return of signals therefrom are phase compared to provide a resultant signal having characteristics distinguishing the object from its background. The radar system of the present invention recognizes scattering objects by the characteristic phase shifts of the scattered signals. This information is separated from other phase shifts due to distance to target, angle of arrival, motion of target, and other causes by the use of multiple transmitted and received non-integral harmonic signals. By suitable processing of the non-integral signals and phase comparison of the reflected signals phase distinguishing characteristics of the targets are measured and displayed. Metal objects may be distinguished from lossy objects such as trees or from lossy earth and water surfaces, particularly when the metal targets have dimensions approximately the same as half wavelengths of one of the transmitted frequencies.

The use of phase reflection coefficients of radar targets as a means of recognizing them and the means for measuring the phase characteristics invariant and undisturbed by other phase changes is one of the uniquely important features of this invention.

It is emphasized the radar of the present invention allows recognition of resonant metal targets in a background of natural reflections from earth and vegetation. The radar also makes possible direct measurement of the maximum dimensions of aircraft or other metal objects by suitable choice of hardware frequencies. It is also noted that the present radar way be utilized in reconnaissance-strike operations seeking trucks, tanks, missile sites on the earth's surface, and for attacking low flying aircraft by detecting them against terrain background. It is also useful for the identification of aircraft by measuring the maximum dimensions.

An object of the present invention is to provide a radar system transmitting multiple non-integral signals having a coherent harmonic relationship toward an object of interest and return signals therefrom are phase compared to provide resultant signals having characteristics distinguish the object.

Another object of the present invention is to provide a radar system transmitting multiple non-integral signals that have a coherent-harmonic relationship towards a target of interest with the return signals therefrom being phase compared to provide resultant signals to be matched against previously stored sets of information for target identification.

The various features of novelty which characterize this invention are pointed out with particularity in the claims annexed to and forming a part of this specification. For a better understanding of this invention, however, its advantages and specific objects obtained with its use, reference should be had to the accompanying drawings and descriptive matter in which is illustrated and described a preferred embodiment of the invention.

BRIEF DESCRIPTION OF THE DRAWINGS

The single FIGURE of the drawings shows a block diagram of a radar system for transmitting multiple non-integral signals having a coherent-harmonic relationship towards a target and processing the return signals in phase to provide characteristics distinguishing the target.

DESCRIPTION OF THE PREFERRED EMBODIMENT

Now referring in detail to the single FIGURE of the present invention, there is shown stable oscillator 1, generating a signal having a frequency of 50 MHz which is illustrative only, other frequencies also may be utilized. It is obvious that the wavelength (or frequency) will be selected to find the objects of interest, assuming their sizes are roughly known. The radar may be pulsed or CW. Stable oscillator 10 may be similar to the type of stabilized oscillator known as STALO or may be a radar type oscillator having a high degree of frequency stability. The output signal, $f_1$, is fed simultaneously to multipliers 2, 3, 4 ... 5n. Multipliers 2, 3, 4 ... 5n multiply the inputs thereto by 3, 4, 5 ..., n to provide signals having frequencies of 150 MHz, 200 MHz, 250 MHz, ..., $n \times 50$ MHz which are high power amplified by simultaneously keyed amplifiers 6, 7, 8 ... 9n, respectively. Modulator 10 is provided to simultaneously key amplifiers 6, 7, 9 ... 9n. The pulsed output signals from amplifiers 6, 7, 8 ... 9n are non-integral and have a coherent-harmonic relationship and are transmitted toward the object or target of interest by way of duplexer 11 and common wideband antenna 12.

The return echoes from the target or targets of interest are received by antenna 12, pass through duplexer 11 and are fed to receivers 14, 15, 16, ... 17n which are tuned to 150 MHz, 200 MHz, 250 MHz, ..., $n \times 50$ MHz, respectively.

The received signals (return echoes) are $$R_1 = E_1 \cos(\omega_1 t + 4\pi R/\lambda_1 + \phi_{c_1})$$

$$R_2 = E_2 \cos(\omega_2 t + 16/3)(\pi^R/\lambda_1) + \phi_{c_2})$$

$$R_3 = E_3 \cos(\omega_3 t + 20\pi R/3\lambda_1 + \phi_{c_3})$$

$$R_n = E_n \cos(\pi_n t + 4n\pi R/3\lambda_1 + \phi_{c_n})$$

$$\omega_1 = 2\pi \times 150 \times 10^6$$

$$\omega_2 = 2\pi \times 200 \times 10^6$$

$$\omega_n = 2\pi \times n \times 50 \times 10^6$$

$\phi_{c_n}$ is target phase.

$\lambda_1$ is wavelength at $\omega_1$ and $R$ is target range.

The output signals from receivers 14, 15, 16, ..., 17n are fed to phase detectors 18, 19, 20, ..., 21n, respectively. Thus the received signals are compared in phase with the transmitter CW (continuous wave) signals of the same frequency. The result is a voltage output such as indicated from the following phase detectors:

phase detector $18 = (4\pi R/\lambda_1) + \phi_{c_1}$
phase detector $19 = (16\pi R/3\lambda_1) + \phi_{c_2}$
phase detector $20 = (20\pi R/3\lambda_1) + \phi_{c_3}$
phase detector $21_n = (4n\pi R/3\lambda_1) + \phi_{c_n}$ The output voltage from phase detectors 18, 19, 20, ... 21 n are then scaled by scalers 22, 23, 24, ... 25n, respectively, to provide the following outputs:

output scaler $22 = (4\pi R/\lambda_1) + \phi_{c_1}$
output scaler $23 = (4\pi R/\lambda_1) + 3/4 \phi_{c_2}$
output scaler $24 = (4\pi R/\lambda_1) + 3/5 \phi_{c_3}$
output scaler $25n = (4\pi R/\lambda_1) + 3/n \phi_{c_n}$ It is noted that scalers 22, 23, 24, ... 25n effectively multiplies in the above example by 1, three-fourths, three-fifths, ..., three-nths, respectively.

The output signals from scalers 22 and 23 are compared in difference amplifier 26 to provide an output difference signal equal to $\phi_{c_1} - 3/4 \phi_{c_2}$. The output signals from scalers 23 and 24 are compared in difference amplifier 27 to provide an output difference signal equal to $3/4\phi_{c_2} - 3/5\phi_{c_3}$. The output signals from scaler 24 and 25n are compared in difference amplifier $28_n$ to provide an output difference signal equal to $3/5\phi_{c_3} - 3/n\phi_{c_n}$. It is noted this technique can be accomplished for any frequency and for any number of frequencies.

The aforesaid difference signals are representative of the target or targets of interest and are usually in the form of a set.

The difference signals are fed to conventional type computer 29 in which there has been previously stored sets of information, each set being representative of a particular type of return signals from a particular type of target of interest previously determined. Thus a set of difference signals are matched in the computer against each set of stored information and when they coincide with any stored set an output signal from the computer is provided which is then presented visually on display 30. Visual display 30 may be the conventional type radar indicator connected in the conventional manner. It is emphasized again that the difference signals are representative of the target or targets of interest.

While in accordance with the provisions of the statutes, we have illustrated and described the best form of the invention now known to us, it will be apparent to those skilled in the art that changes may be made in the form of the system disclosed without departing from the spirit of the invention as set forth in the appended claims, and that in some cases certain features of the invention may be used to advantage without a corresponding use of other features.

Having now described our invention, what we claim as new and desire to secure Letters Patent is:

1. A radar system of recognizing signal scattering targets of interest such as tanks and aircraft by the characteristic phase shifts of the reflected scattered signals therefrom comprising means to generate a multiplicity of frequency stable non-integral signals, each having a different frequency and being in coherent-harmonic relationship, separate means to amplify the power of each of said multiplicity of non-integral signals, means to transmit each of said power amplified multiplicity of non-integral signals toward the target of interest, antenna means receiving a multiplicity of reflected signals from said target, said multiplicity of reflected signals being equal to said multiplicity of transmitted signals, a multiplicity of receivers, said multiplicity of receivers including a separately tuned receiver for each of said multiplicity of reflected signals, a separate phase detector for each output of each of said receivers, to provide a first input thereto, each of said phase detectors simultaneously receiving as a second input one of said generated signals with a frequency identical to said first input, a scaler having a preselected constant for each output of each phase detector, and means to compare the voltage difference between each pair of scaler to provide a set of difference signals, said set of difference signals being representative of the target of interest.

2. A radar system as described in claim 1 wherein said means to generate a multiplicity of frequency stable signals is comprised of a stabilized oscillator providing a continuous wave signal of a preselected frequency, a multiplicity of means to multiply said generated signal of preselected frequency, each of said multiplying means having a different multiplying constant to provide a multiplicity of non-integral signals having a coherentharmonic relationship.

3. A radar system as described in claim 1 further including computer means having stored therein a multiplicity of sets of information, each of said stored sets being representative of a prior determined target, said computer receiving said set of difference signals for comparison against each of said stored sets and upon coincidence between compared sets providing an output therefrom.

4. A radar system as described in claim 3 further including visual indicating means receiving the output from said computer means.

* * * * *